(12) United States Patent
Ogata et al.

(10) Patent No.: US 8,858,861 B2
(45) Date of Patent: Oct. 14, 2014

(54) METHOD AND APPARATUS FOR FORMING OVERMOLDED CONTAINER

(75) Inventors: Satoshi Ogata, Tokyo (JP); Kenzo Teshima, Tokyo (JP); Susumu Hirose, Tokyo (JP)

(73) Assignee: Yoshida Industries Co., Ltd., Tokyo (JP)

( * ) Notice: Subject to any disclaimer, the term of this patent is extended or adjusted under 35 U.S.C. 154(b) by 286 days.

(21) Appl. No.: 13/281,755

(22) Filed: Oct. 26, 2011

(65) Prior Publication Data

US 2012/0104663 A1    May 3, 2012

(30) Foreign Application Priority Data

Oct. 27, 2010    (JP) ................................ 2010-241283

(51) Int. Cl.
| | | |
|---|---|---|
| *B29C 49/00* | (2006.01) | |
| *B29C 49/22* | (2006.01) | |
| *B29C 45/14* | (2006.01) | |
| *B29L 31/00* | (2006.01) | |

(52) U.S. Cl.
CPC ..... *B29C 45/14336* (2013.01); *B29C 45/14836* (2013.01); *B29L 2031/7158* (2013.01); *B29C 2045/1445* (2013.01)
USPC ............................ 264/510; 264/512; 264/523

(58) Field of Classification Search
None
See application file for complete search history.

(56) References Cited

U.S. PATENT DOCUMENTS

2011/0114653 A1    5/2011    Oogi et al.

FOREIGN PATENT DOCUMENTS

| | | |
|---|---|---|
| FR | 2 631 581 | 11/1989 |
| JP | 4-138241 | 5/1992 |
| JP | 6-23758 | 2/1994 |
| JP | 4377447 | 9/2009 |
| WO | 2010/010682 | 1/2010 |

*Primary Examiner* — Monica Huson
(74) *Attorney, Agent, or Firm* — Wenderoth, Lind & Ponack, L.L.P.

(57) ABSTRACT

A method for forming an overmolded container by covering a hollow inner bottle made of resin with an injection of a molten resin which forms an outer. The method comprises steps of setting the inner bottle in a mold with a space therebetween for forming the outer and circulating a pressurized gas into and out of a hollow space of the inner bottle through an upper opening thereof. The pressurized gas is supplied through a first path which opens toward an inner wall of the inner bottle and discharged out of the inner bottle through a second path. The pressurized gas supplied into and discharged out of the inner bottle is adjusted in pressure while the molten resin is being injected to the mold.

4 Claims, 10 Drawing Sheets

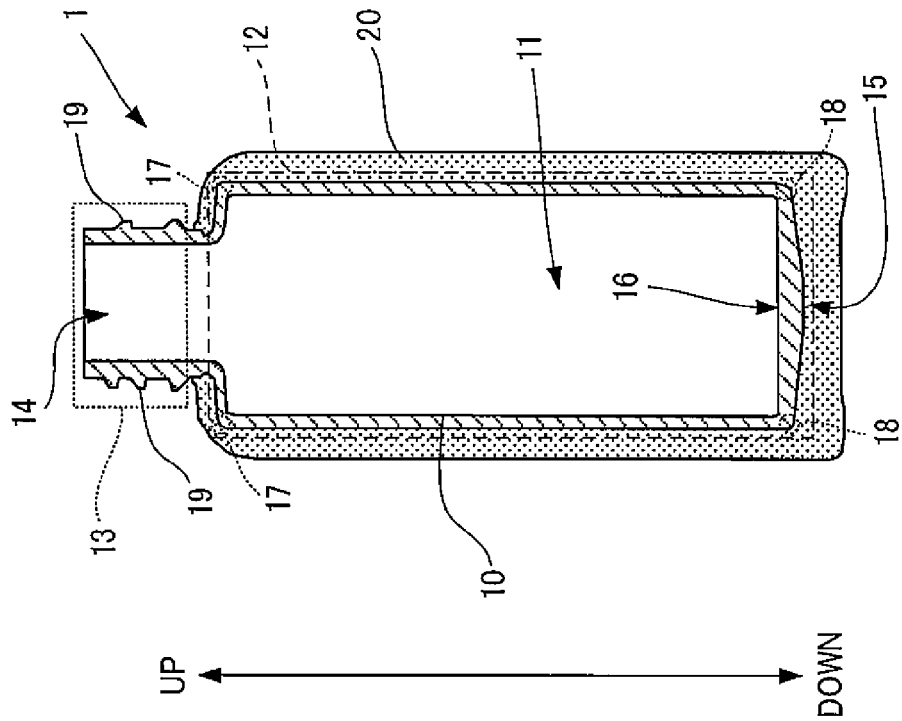
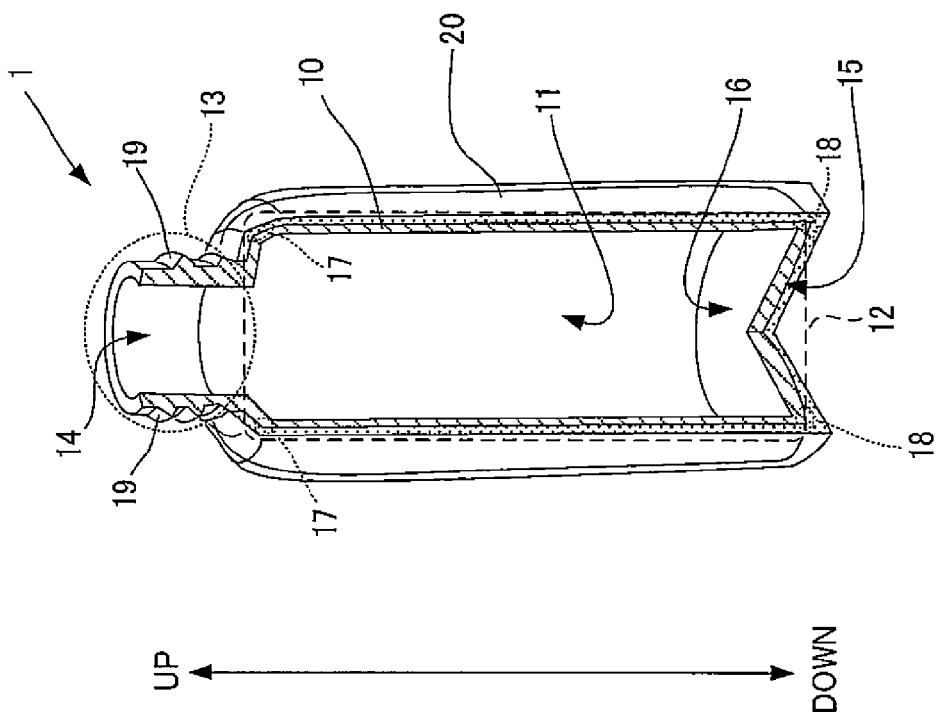

METHOD AND APPARATUS FOR FORMING OVERMOLDED CONTAINER

CROSS-REFERENCE TO RELATED APPLICATIONS

The present application claims priority upon Japanese Patent Application No. 2010-241283 filed on Oct. 27, 2010, which is herein incorporated by reference.

FIELD OF THE INVENTION

The present invention relates to methods and apparatus for forming an overmolded container by covering a surface layer of an inner bottle, that is a hollow body made of a resin, with an outer that is a molded body made by injection of a molten resin. Specifically the invention relates to methods and apparatus for forming an overmolded container in which the inner bottle can be prevented from deforming when forming the outer.

BACKGROUND OF THE INVENTION

As a container to store contents of mainly a liquefied element (for example, cosmetics), such as a liquid or a gel, there is a container referred to as an "overmolded container". This overmolded container has a configuration in which a hollow body to be filled with the contents (hereinbelow, referred to as "inner bottle") is integrally covered with an outer body made by injection molding (hereinbelow, referred to as "outer") of molten resin. As a method of forming this overmolded container, for example, as described in Japanese Patent Application Laid-open Publication No. 06-23758, the inner bottle is manufactured by blow molding or the like, and then the molten resin is injected to an outer side of the inner bottle to form the outer, and thereby the inner bottle and the outer are integrated.

With this overmolded container, for example, by covering the inner bottle made of colored resin with an outer formed of light permeable resin that is transparent or in a ground glass state or a colored glass state, light can be shielded from the contents in the inner bottle to prevent quality deterioration due to outside light, while providing a feel similar to glass and an aesthetically pleasing texture that gives a sense of profoundness and high quality. Further, this container is provided with impact resistance and degrees of freedom in shape since it is made of the resin. Further, in the case of forming decoration of letters and drawings on the outer surface of the inner bottle, and forming the outer with a light permeable resin so that the decoration can be seen through it, an effect can be achieved that the decorated portion is not exposed on the outer surface of the overmolded container, and the product name and the like will not peel off or wear off in principle.

With the overmolded container, however, when injecting the molten resin to an outer surface of the inner bottle and integrating the outer thereon, there is a possibility that the inner bottle deforms or is damaged by the pressure and heat of the molten resin. For example, with the invention described in Japanese Patent Application Laid-open Publication No. 06-23758, the overmolded container is formed by a method in which a core material made of a mixture of superabsorbent resin and water is filled in a preformed shell like an inner bottle and the mixture is frozen and then the shell with the frozen mixture therein is set in a mold for injecting a molten resin for the outer. After forming the outer, the core material inside the inner bottle is melted and removed. But, with this method, the operation in each step becomes complicated, and the number of steps increases, thus resulting in increase in forming cost. Further, in the case the core material cannot be completely removed, the contents to be actually stored inside the inner bottle will be contaminated by the remains of that core material.

With the technique disclosed in Japanese Patent Publication No. 4377447, however, there will be no serious problem if the inner bottle is spherical. However, when molding a cylindrical inner bottle with a cover of outer by injecting the molten resin, there will be serious problems. Because, when forming the outer, a flowing molten resin will remain in a corner portions such as boundaries between a side surface and end surfaces of the cylinder, and a great pressure and heat are applied on the corner portions, and thereby the corner portions will be crushed and deformed. Further, in the case there is decoration on the outer surface of the inner bottle, there is a possibility that the decorated portion flows due to heat from the molten resin, and the appearance of the decorated portion may be deteriorated or may not function as a decoration at all.

Therefore, a solution of cooling the hollow inner portion of the inner bottle may be considered, but if there is an error in a cooling portion or a cooling timing, the resin that becomes the outer may set without spreading in the entire mold and namely a short shot may occur. Note that with the technique described in Japanese Patent Publication No. 4377447, since the inner bottle is closed while molding the outer, it is extremely difficult to perform cooling itself.

SUMMARY

An advantage of some aspects of the present invention is that it is possible to provide a method and apparatus for forming an overmolded container that is of high quality, regardless of the shape of the container, by preventing deformation of an inner bottle and flow on a surface thereof without need of complicated steps. Other advantages will be made clear in the description below.

An aspect of the invention is a method for forming an overmolded container by covering a hollow inner bottle made of resin with an injection of a molten resin which forms an outer. The method comprises steps of setting the inner bottle in a mold with a space therebetween for forming the outer and circulating a pressurized gas into and out of a hollow space of the inner bottle through an upper opening thereof while the molten resin is injected to the mold. The pressurized gas is supplied through a first path which open toward an inner wall of the inner bottle, and the pressurized gas is discharged out of the inner bottle through a second path. The second path is open in the inner bottle at a place away from the opening of the first path. The pressurized gas supplied into and discharged out of the inner bottle is adjusted in pressure while the molten resin is being injected to the mold.

Another aspect of the invention is a method of forming an overmolded container, wherein the inner bottle is formed to have a corner portion, and the pressurized gas supplied into the inner bottle is blown through the opening of the first path, which opening is opposite to the corner portion.

Another aspect of the invention is a method of forming an overmolded container, wherein an outer surface of the inner bottle has a printed decoration, and the outer is made of a light permeable resin, and wherein the pressurized gas supplied into the inner bottle is blown through the opening of the first path, which opening is opposite to the decorated portion.

Another aspect of the invention is an apparatus for forming an overmolded container by covering a hollow inner bottle made of resin with an injection of a molten resin which forms an outer. The apparatus comprises a mold in which a preformed inner bottle is set with a space between an outer surface of the inner bottle and an inner surface of the mold, means for injecting a molten resin through the mold into the space between the inner bottle and the mold, and a columnar rod to be inserted in the inner bottle in which the upper end of the columnar rod is exposed to the outside of the inner bottle in a state inserted in the inner bottle. The columnar rod is provided with first and second vent paths extending therein along an axial direction of the rod form outside of the inner bottle to inside thereof. The first vent path is connected at the outside of the inner bottle with a pressurized gas supply source by means of a first adjusting valve, while the second vent paths is connected at the outside of the inner bottle with an exterior space by means of a second adjusting valve. The first and second adjusting valves are adjusted for controlling a gas pressure supplied into the inner bottle through the first valve and exhausted from the inner bottle through the second valve while the molten resin is injected into the space between the mold and the inner bottle.

Other features of the present invention will be made clear through the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIGS. 1A and 1B are diagrams showing examples of an overmolded container that is a subject of the present invention;

Figure 2:
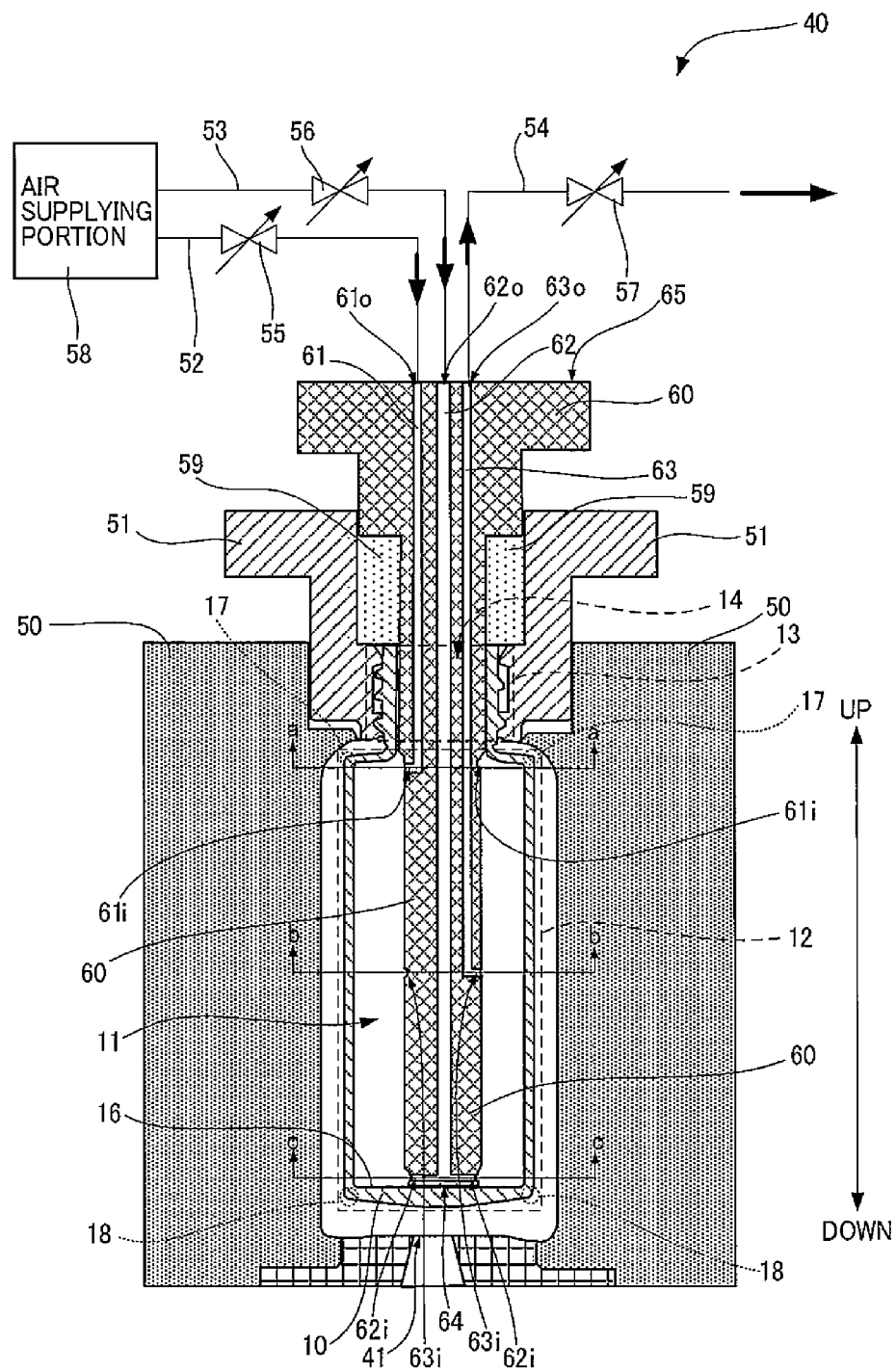
FIG. 2 is a schematic structural diagram of an apparatus according to an embodiment of this invention.
Figure 3A:
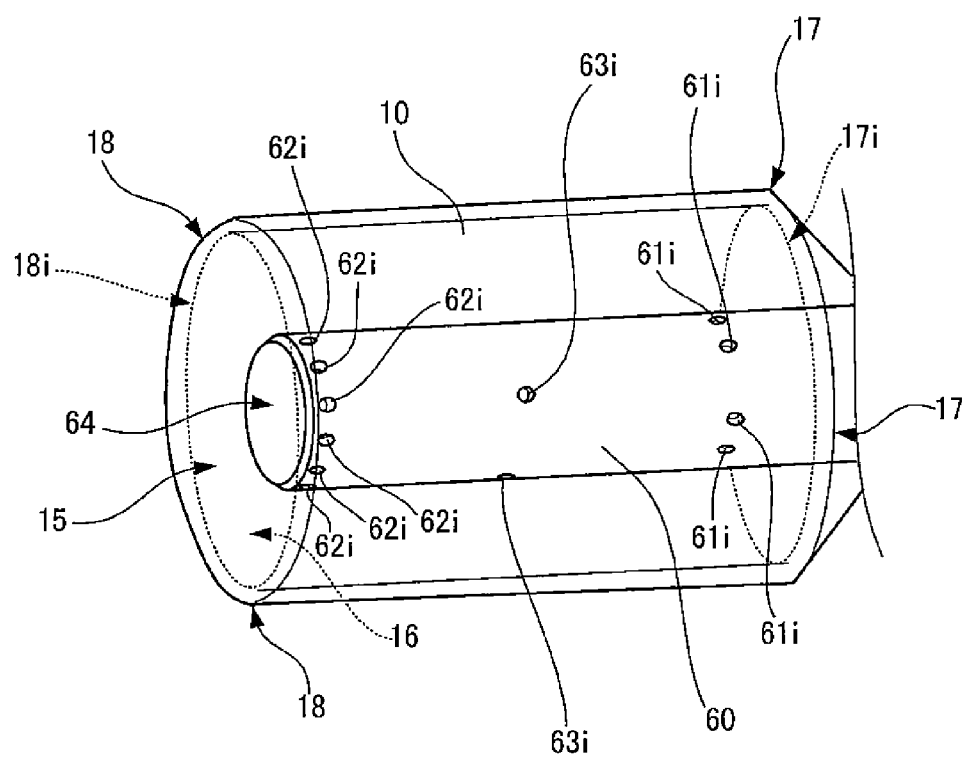
FIGS. 3A to 3D are diagrams showing a structure of a rod configuring the present apparatus.
Figure 3B:
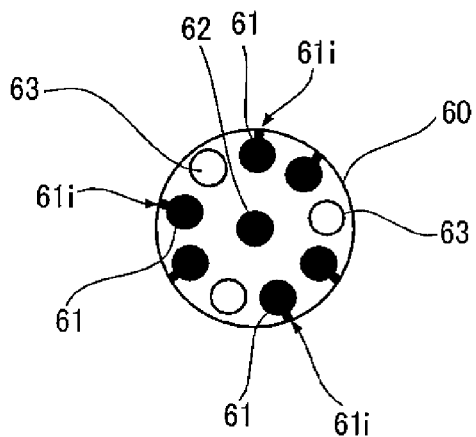
Figure 3C:
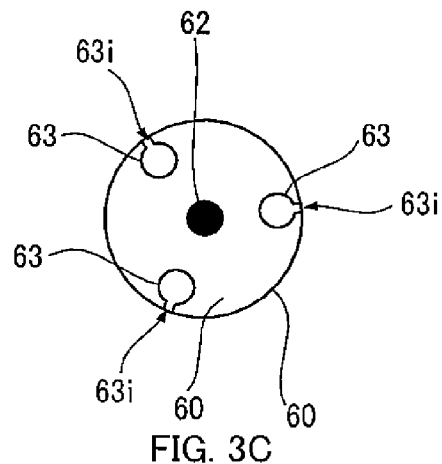
Figure 3D:
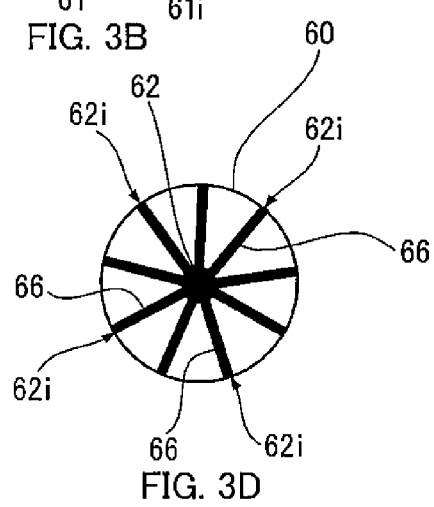

DESCRIPTION OF PREFERRED
EMBODIMENTS OF THE PRESENT
INVENTION

Structure of Overmolded Container

FIG. 1 is a diagram showing an embodiment of an overmolded container 1 formed according to the present invention. FIG. 1(A) is a partially cutaway perspective view of the container 1. The overmolded container 1 has an inner bottle 10 for storing contents such as cosmetics and an outer 20 that covers a surface of the inner bottle 10 integrally.

Here, when an up-down direction or a vertical direction is defined with the opening 14 as upwards and a bottom portion 15 as downwards of the overmolded container 1, FIG. 1(B) corresponds to a vertical cross section view of the overmolded container 1. In the embodiment shown, the inner bottle 10 is a shape in which a cylindroid neck portion 13 that is narrower in diameter than a storing portion 12 has been integrally formed in an upper end of the cylindroid storing portion 12, and the contents are filled in a hollow portion 11 which is the storing portion 12. The hollow portion 11 connects to the opening 14 via an inner side of the neck portion 13. On the outer surface of the neck portion 13 are formed projections and depressions 19 to screw on or fit a cap to close the overmolded container 1. The outer 20 is formed to cover a region of the storing portion 12 of the inner bottle 10, namely from a base (lower end) of the neck portion 13 to a bottom portion 15, and the neck portion 13 of the inner bottle 10 is exposed outside from the outer 20.

The overmolded container 1 shown in FIG. 1 has a similar structure as a general overmolded container, but this invention has a feature in the method and apparatus for forming the overmolded container 1.

According to an embodiment of this invention, deformations can be prevented in the corner portions 17 and 18 of the inner bottle 10 where heat and pressure is prone to concentrate, namely, in the case where the storing portion 12 is a cylindroid, the peripheral portions (shoulder portions) 17 that become the boundary between the side surface and the upper end surface of the cylinder and peripheral portions 18 of the lower end surface (bottom portion) 15. Further, it also becomes possible to prevent deterioration of the decoration made on the surface of the inner bottle 10 when heat flows on the surface when injection molding the outer 20.

===Schematic Structure of Forming Apparatus===

According to the present invention, there is provided an apparatus to form an overmolded container 1 shown in FIG. 1. FIG. 2 is a schematic diagram of the apparatus 40. In this diagram, main components of the present apparatus 40, various members and accessory devices, ducts and the like are shown. This apparatus 40 has a mold 50 that is used for injecting molten resin for forming the outer 20 and includes, in a state with the inner bottle 10 set in the mold 50, a columnar rod 60 to be inserted in the hollow storing portion 12 of the inner bottle 10, duct paths 52-54 to be connected to the rod 60, valves 55-57 that lie in extensions of the duct paths 52-54, and an air supplying portion 58 such as a pump or a cylinder filled with compressed gas. As shown in FIG. 2, the mold 50 for forming the outer has a gate 41 opposite to the bottom portion of the inner bottle 10, and the inner bottle 10 is set in the mold 50 in a state the neck portion 13 is secured with the holding member 51.

The columnar rod 60 is inserted into the hollow storing portion 12 via the neck portion 13 from the upper opening 14 of the inner bottle 10. In this example, the rod 60 is inserted so that a leading end (bottom end) 64 comes into contact with an inner bottom surface 16 of the storing portion 12. The upper end 65 is exposed from the opening 14 of the inner bottle 10 and extends to outside of the mold 50.

The rod 60 is formed with a heat-resistant material such as metal or a heat-resistant resin, and in the inside thereof are formed vent pipes 61-63 that are to be paths for a gas (air) along an axial direction of the rod 60. One of the ends 61o-63o of the vent pipes 61-63 open at the outside of the inner bottle 10, and the other ends 61i-63i open at the side surface of the rod 60 in the hollow portion 11 of the inner bottle 10.

FIG. 3 is a diagram showing a schematic configuration of the rod 60 in FIG. 2. FIG. 3(A) shows a perspective view of the rod 60 in a state inserted in the inner bottle 10. Further, FIG. 3(B) to (D) each show each cross section view of a-a, b-b, c-c view in FIG. 2. The exemplified rod 60 is columnar, and has a circular cross section as shown in FIG. 3(B) to (D). With the rod 60, in a section from the upper end 65 side of the rod 60 that is exposed to outside the inner bottle 10 to the lower end of the neck portion 13 of the inner bottle 10, the vent pipes 61-63 are arranged in both a center of the circular cross section and a periphery thereof, as shown in FIG. 3(B). These plurality of vent pipes 61-63 have two types of vent pipes which are the vent pipes to supply air outside the inner bottle 10 to inside the inner bottle 10 (supply pipes 61, 62) and the vent pipes to exhaust air inside the inner bottle 10 to the outside (exhaust pipe 63). In FIG. 3(B) to (D) one example of an arrangement of supply pipes 61 and 62 and exhaust pipes 63 is shown, and supply pipes are shown by black circles "●" and exhaust pipes are shown by white circles "○". Further, in this example, there are two types of supply pipes 61 and 62, which are the supply pipe 62 that penetrates the center of the circular section of the rod 60 and extends to the lower end 64 of the rod 60, and a plurality of supply pipes 61 arranged along a circumference of the circular section and that extend to near the lower end of the neck portion 13 of the inner bottle 10. A plurality of the exhaust pipes 63 are arranged along the circumference of the circular section, and extend to a position in approximately the center in length from the neck portion 13 to the bottom surface 16 in the inner bottle 10. As shown in FIG. 3(B) and (C), the plurality of supply pipes 61 along the circumference of the circular section and the plurality of exhaust pipes 63 individually connect to the openings 61i and 63i. As shown in FIG. 3(D), the one supply pipe 62 that penetrates the center in the circular cross section is connected to air outlets 62i via branching paths 66 radially extending toward the plurality of air outlets 62i.

On the other hand, the other openings 61o to 63o of the vent pipes 61 to 63, namely the openings 61o to 63o exposed to the outside of the inner bottle 10, are connected with the ducts 52 to 54 to introduce air into the inner bottle 10 via the supply pipes 61 and 62 of the rod 60 and to guide the air inside the inner bottle 10 to outside the inner bottle 10 via the exhaust pipes 63.

Here, for the sake of convenience, the outer side openings 61o and 62o and the inner side openings 61i and 62i of the inner bottle 10 of the supply pipes 61 and 62 are referred to as air introducing openings and air outlets, respectively, and the side opening 63o of the inner bottle 10 of the exhaust pipe 63 is referred to as an air guiding opening and the inner side opening 63i is referred to as an air exhaust opening. In the forming apparatus 40, the air introducing openings 61o and 62o are connected with ducts (air supply paths 52 and 53) from the air supplying portion 58 such as a pump to compress the atmosphere or a predetermined gas (such as nitrogen) or a cylinder filled with compressed gas (for example, inert gas such as nitrogen, compressed air or the like). Further, the air guiding opening 63o is connected with a duct that is released to the atmosphere (air exhaust path 54), and the air in the inner bottle 10 is exhausted to outside the bottle 10 via the air exhaust path 54. Further, midway in the air supply paths 52 and 53 are intervened valves (hereinbelow, supply valves 55 and 56) to adjust the amount of air to flow into the inner bottle 10, and in the air exhaust path 54 is an intervened valve (hereinbelow an exhaust valve 57) to adjust the amount of air to flow out of the inner bottle 10 from inside the bottle 10.

Note that, the arrangement of the supply pipes 61 and 62 and the exhaust pipes 63 formed in the rod 60 is not limited to the example shown in FIG. 3. For example, the exhaust pipes 63 and the supply pipes 61 that extend to the inner portion of the inner bottle 10 can be made as one similarly to the supply pipe 62 that extends to the leading end of the rod 60 and branches to a plurality of the openings 62i, as shown in FIG. 3(D). In the case of making the rod 60 branch out, such branching paths may be branched out in between other vent pipes. Further, with the rod 60 shown in FIG. 3, individual supply pipes 61 and 62 are provided vertically through the rod 60, but it is not limited to this example. For example, the supply pipes 61 and 62 each can be made as one pipe and can be connected to each air outlet 61i and 62i by radially branching out in the positions corresponding to each of the shoulder portions 17 and the bottom peripheral portions 18.

=== Forming Method ===
<Preferred Embodiment>

A method for forming an outer 20 on an inner bottle according to an embodiment of this invention will be described based on the apparatus 40 shown in FIG. 2. First, the inner bottle 10 that has previously been formed is set in a forming mold 50 of the outer 20. In this embodiment, the inner bottle 10 is set in the mold 50 with the neck portion 13 being fixed with the holding member 51. Then, the rod 60 is inserted from the opening 14 of the inner bottle 10. Note that, the upper end portion 65 of the rod 60 is made larger in diameter than a portion to be inserted into the inner bottle 10 and has a stepped cylindrical shape. The lower portion of the stepped cylindrical shape is in close contact with an upper inner surface of the holding member 51 of the inner bottle 10. Further, a hollow portion between the upper end portion 65 of the rod 60 and the holding member 51 is filled with a sealing member (for example, a resin such as rigid urethane foam, or rubber) 59. In the state where the rod 60 is inserted to a predetermined position as shown in FIG. 2, flow channels of the gas from in and out of the inner bottle 10 are only the vent pipes 61 to 63 in the rod 60.

In the state where the rod 60 is inserted in the inner bottle 10, the molten resin to form the outer 20 is injected into the mold 50 via the gate 41. In parallel to or before this injection step, the air is supplied into the inner bottle 10 via the air supply paths 52 and 53 and the supply pipes 61 and 62 from the air supplying portion 58, and the internal pressure of the inner bottle 10 is raised.

When the internal pressure of the inner bottle 10 becomes high as desired, supplying and exhausting of the air are balanced. Accordingly, the air from the outside at a predetermined temperature is supplied into the inner bottle 10 from the air outlets 61i and 62i via the supply pipes 61 and 62, and the air in the inner bottle is exhausted from the air exhaust openings 63i via the exhaust pipes 63 and the air exhaust path 54 through the air guide opening 63o. Namely, the air is circulated from in and out of the inner bottle 10, and the air at a constant temperature will be supplied at all times into the inner bottle 10. Therefore, in the inner bottle 10, temperature change over time does not easily occur, the inside of the inner bottle 10 is maintained in a state cooled to approximately a constant temperature, and there is no internal pressure fluctuation due to change in temperature, so that the pressure inside the inner bottle 10 is maintained approximately constant. In order to more actively cool the inside of the inner bottle 10, it is possible to provide an air cooling system in the air supply source 58 or midway in the air supply paths 52 and 52.

Generally, it is common to cool the mold 50 when injection molding. In this embodiment, the injected resin for forming the outer 20 is cooled from the outside by contacting the inner wall of the mold 50. Also, as the pressure inside the inner bottle 10 is maintained to a predetermined high level so that the inner bottle 10 cannot be deformed inwards by the pressure of the injected resin, the resin filled between the outside of the inner bottle 10 and the mold 50 is pressed against the inner wall of the mold 50. As the inner surface of the inner bottle 10 is cooled, the resin injected in the mold is cooled from both sides of the mold and the inner bottle. Namely, the outer 20 is cooled extremely efficiently.

Figure 4:
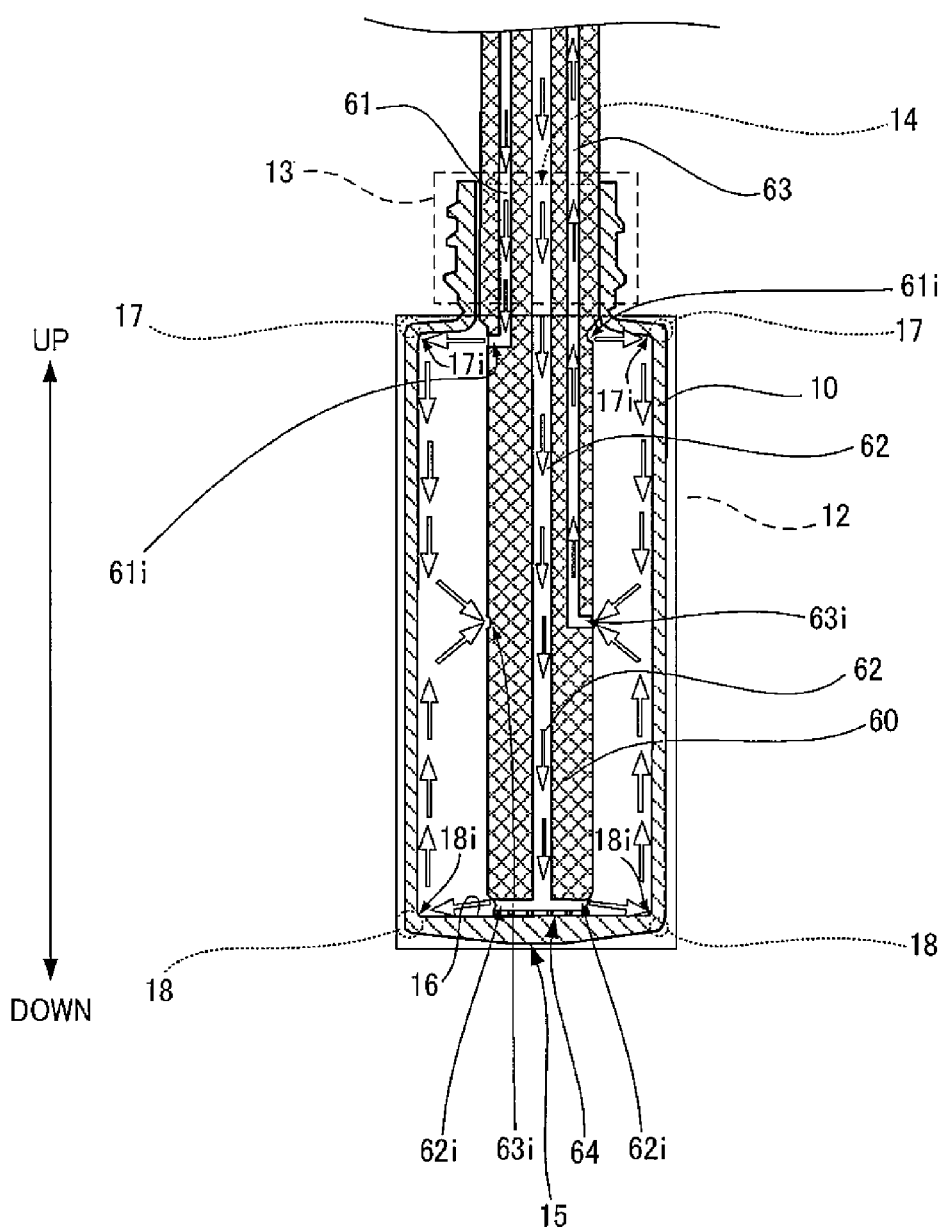
FIG. 4 is a schematic diagram showing an inside of the container when forming the overmolded container using the present apparatus.

FIG. 4 is a schematic diagram showing a flowing state of the air in the inner bottle 10. With the apparatus 40 shown in FIG. 2, the air outlets 61*i* and 62*i* are open in both the top and bottom ends of the hollow portion 11 of the inner tube 10, namely near the base of the neck portion 13 and near the bottom surface 16. The air exhaust outlet 63*i* opens in approximately a central portion between the base of the neck portion 13 and the bottom surface 16 of the inner bottle 10. Therefore, as shown by white arrows in the diagram, the air inside the inner bottle 10 is made to spread and circulate smoothly and to every corner. It should be noted that, since the opening positions of the air outlets 61*i* and 62*i* are in positions opposite to the corner portions 17 and 18 of the inner tube 10 and the air outlets 61*i* and 62*i* are extending in radial directions about the center of the rod 60, the air supplied into the inner bottle 10 is directly blown on to the corner portions 17*i* and 18*i* which are corresponding to the shoulder portion 17 and the periphery 18 of the bottom portion 15 in the hollow portion 11 of the inner tube. As described above, the corner portions 17 and 18 are areas where heat and pressure remain and where deformation is hard to prevent. In this embodiment, however, the pressure of the air is first selectively applied to the corner portions 17*i* and 18*i* corresponding to parts 17 and 18 which are difficult to prevent deformation, and these parts 17 and 18 are cooled with priority. Accordingly, even in the case the inner bottle 10 having the cylindrical storing portion 12, deformation can be certainly prevented. In this way, the mold 50 is opened after cooling and hardening the injected resin, and the overmolded container 1 which is the final molded article is taken out of the mold 50.

===Arrangement of Air Outlets===

<In Case of Making Decoration on an Inner Bottle>

With the overmolded container 1 using the light permeable resin for the outer 20, decoration is often made on the outer surface of the inner bottle 10. There is a problem that the outer surface of the inner bottle 10 will melt and tend to flow because the outer surface contacts with the molten resin at a high temperature when forming the outer 20. The decoration is a display of letters and design, and in the case the outer surface of the inner bottle 10 flows, the letters and design will become contorted. Alternatively, minute projections and depressions will occur on the surface of the decorated portion, and the appearance of the decoration may be spoiled, or the quality such as transparency similar to glass, and a quality of the material of the outer 20 itself may be spoiled.

Further, the decoration is performed by silk printing using ink, or by hot stamping using such as a sheet of metallic foil or a resin film. When forming the outer 20, there is a possibility that the ink or the resin used for the decoration may denature by heat. If the decorated part denatures, a problem that the decorated part changes color or the like will occur. With hot stamping of the metallic foil, heat concentrates on such part, so that the possibility that the surface of the inner bottle 10 made of resin melts and flows will increase.

Figure 5:
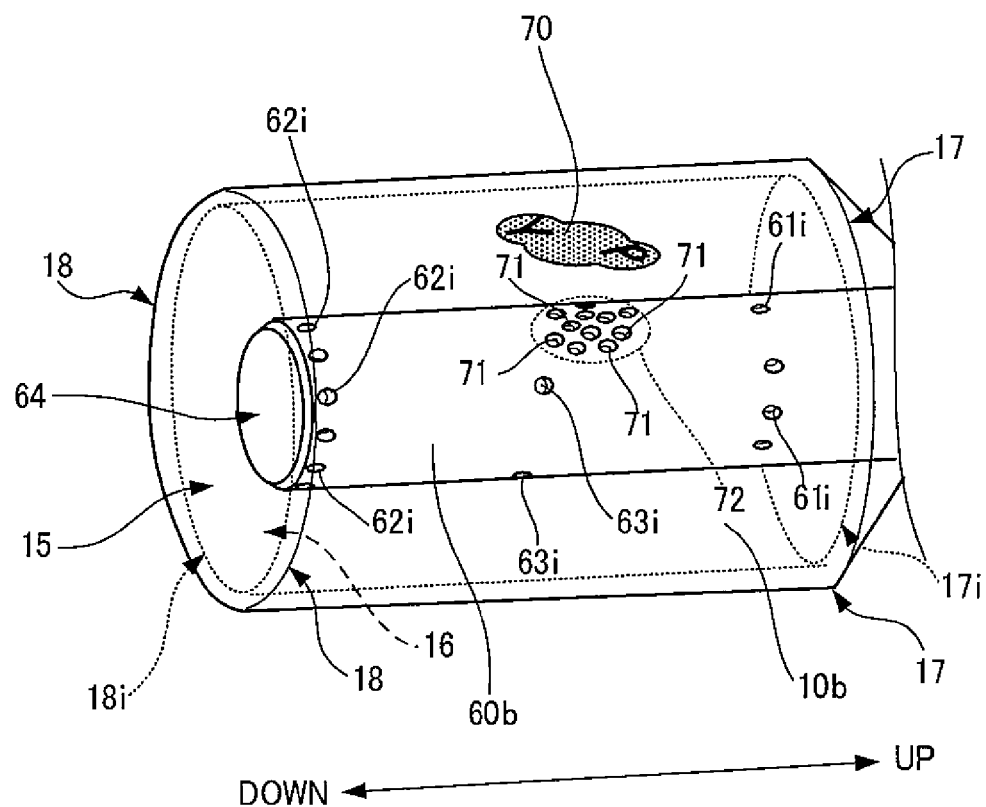
FIG. 5 is a diagram showing an example of a rod having a structure appropriate to form the overmolded container that has been decorated.

According to a preferred embodiment of the present invention, as shown in FIG. 5, with the inner bottle 10*b* provided with the decoration 70, by using the rod 60*b* provided with dedicated air outlets 71 corresponding to the decorated part 70, as similar to the corner portions 17 and 18, the air can be blown on the inner side of the decorated part 70 with priority, and a cooling effect can be partially increased on the decorated part 70. In this embodiment, the rod 50 is provided with, in addition to air outlets 61*i* and 62*i* to blow on air directly to the corner portions 17*i* and 18*i* of the inner bottle 10*b*, a plurality of air outlets 71 arranged concentrated in a region 72 corresponding to a back side of the decorated part 70 of the inner bottle 10*b*.

<Modifications of Shape and Raw Material of Rod>

Figure 6:
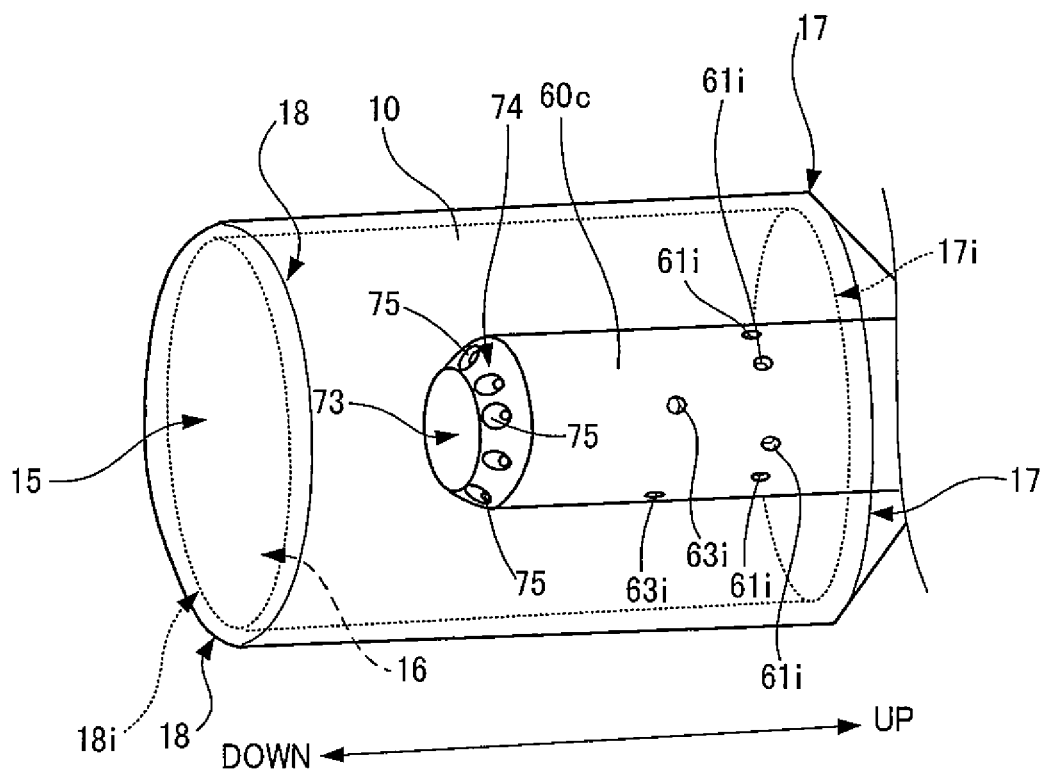
FIG. 6 is a diagram showing another embodiment of the rod.

As a configuration to blow air selectively and with priority to a predetermined portion, as shown in FIG. 6, a leading end 73 of the rod 60*c* may be gradually made smaller in diameter to form an inclined surface 74, and provided with air outlets 75 on the inclined surface 74. In this case, there is no need to extend the rod 60*c* close to the bottom surface of the inner bottle 10. The air is blown out in an inclined downward and radial direction in respect to the axial direction of the rod 60*c*, and the air from the air outlets 75 are directly blown onto corner portions 18*i* of the inner bottle. With such a configuration of the rod, a similar effect to the rod 60 shown in FIG. 3 can be obtained.

Regarding the raw material of the rod, other than a solid metallic material or a heat-resistant resin, a porous metal can be used. In such a case, the air outlets and the air exhaust outlet can be formed uniformly on an entire surface of the porous raw material. In any case, two kinds of paths of different flow directions for supply and exhaust of air are formed inside the rod, and both ends of the two kinds of paths are connected at the openings, and the air can be circulated from in and out of the inner bottle. Then, if necessary, air outlets may be provided so that air can be blown on selectively to portions in which deformation tends to occur or portions which should be cooled with priority.

<Modification of Shapes of Inner Bottle>

Figure 7A:
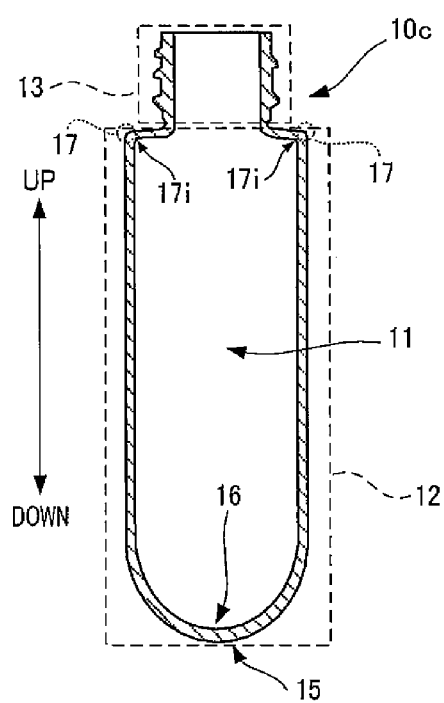
FIGS. 7A to 7D are diagrams showing examples of the overmolded container with corner portions.
Figure 7B:
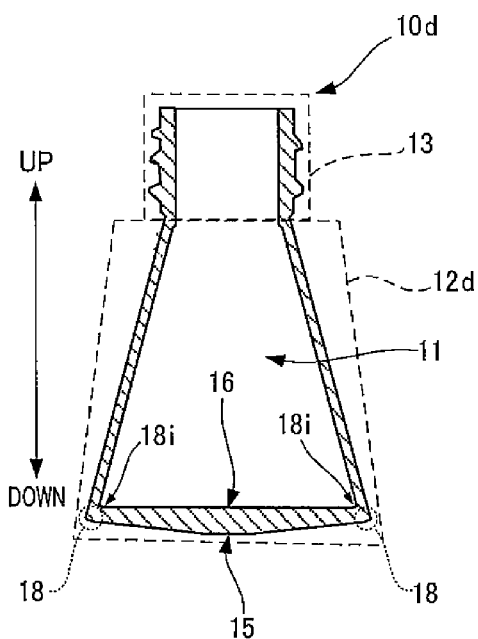

The shape and arrangement of the air outlets can be appropriately changed in accordance with the shapes of the inner bottle and the like. FIGS. 7A to 7D show various vertical cross section shapes of the inner bottle 10*d* to 10*f*. As shown in FIG. 7(A), when the inner bottle 10*c* is namely a test tube type in which the bottom portion 15 of the storing section 12*c* protrudes in a semi-circular shape, the corners are only the shoulder portions 17, and the air may be selectively blown on to the corner portions 17*i*. On the contrary, as shown in FIG. 7(B), in a flask shaped container 10*d*, in which the storing portion 12*d* converges like a frust-conical shape toward the neck portion 13, there is in effect no shoulder portion 17. Therefore, there needs to be only air outlets that selectively blow on the air to the corner portions 18*i* of the bottom surface 16.

Figure 7C:
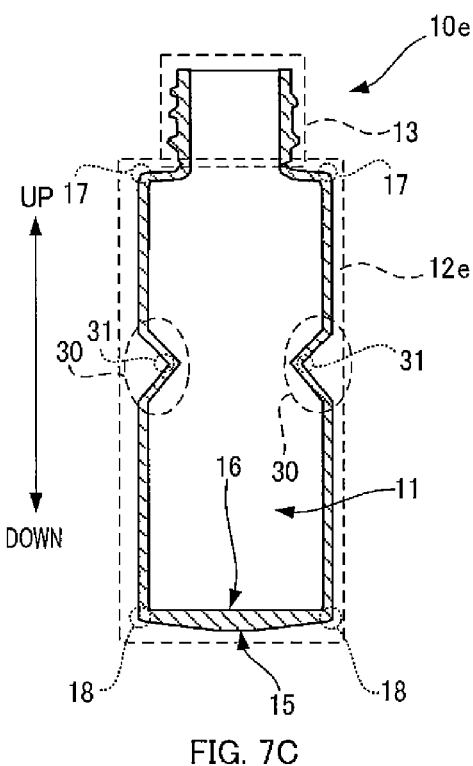
Figure 7D:
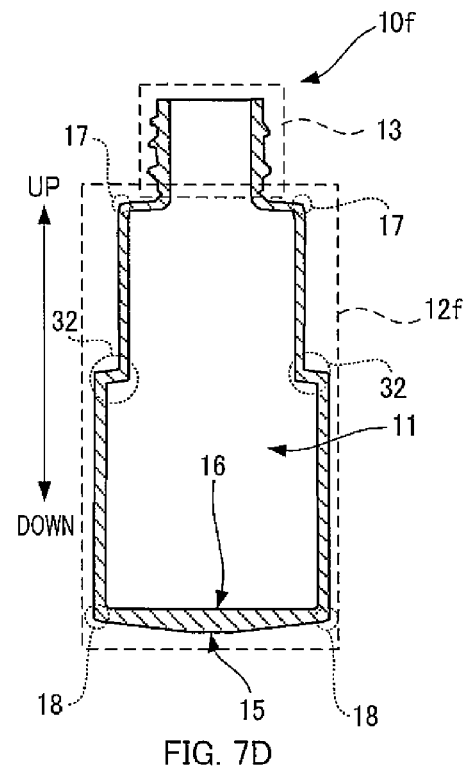

There is also an inner bottle 10*e* that has a constricted portion 30 in the center of the storing portion 12*e* shown in FIG. 7(C) and a multi stage cylindrical inner bottle 10*f* shown in FIG. 7(D). With the inner bottles 10*e* and 10*f* having such shapes, the sections 31 that protrude inward of the storing portion 12*e*, due to the constricted portion 30, and the joining section 32 of the multistage cylinder become corner portions. With the inner bottles 10*c* to 10*f* having such shapes, the rod and air outlets may be formed so as to blow air selectively to the sections corresponding to each of the corner portions 17, 18, 31 and 32. Of course, even with the above-described test tube type inner bottle 10*c* and the flask type inner bottle 10*d*, due to flowability of the molten resin to form the outer, there may be a case where heat and pressure concentrates in the periphery of the bottom portion 15 and the neck portion 13. In such a case, air may be selectively blown on to the periphery of the bottom surface 16 and the neck portion 13 of the inner bottle.

Further, on the other hand, there may be cases where there are no corner portions in the inner bottle, or where even if there are corner portions such sections do not deform easily due to such as flowability of the molten resin. In such cases, the air outlets do not have to be unevenly distributed to a particular section of the rod, and the air outlets can be uniformly distributed on a side surface of the rod, or provided in only one section.

<Gate>

As a portion to which the air is selectively blown on, there will be a portion other than the corner portions. For example, in the above embodiment, a gate 41 of the mold 50 is provided opposite to the bottom portion 15 of the inner bottle 10. In this embodiment, high temperature molten resin from this gate 41 first comes into contact with the bottom portion 15 of the inner bottle 10. In addition, the injection pressure of the molten resin is directly applied to the bottom portion 15 of the inner bottle. Due to molding conditions such as injection pressure and temperature of the molten resin, or the thickness of the bottom portion 15 of the inner bottle 10, the bottom portion 15 becomes a portion that may deform easily. Therefore, the air outlets that open toward the bottom surface 16 of the inner bottle may be formed on the tip end 64 of the rod 60 so that this section can be selectively pressurized or cooled. In this case, the supply pipe 62 that penetrates vertically in the center of the rod 60 as shown in FIGS. 2 and 3, may be extended to the tip end 64 of the rod 64, and the air outlets 62*i* may be opened on the tip end 64. Note that, the positional relationship between the gate 41 and the inner bottle 10 is not limited to the above embodiments, and in the case where the gate 41 is in other positions, similarly the air can be blown on selectively to the portions corresponding to the gate 41 in the inner bottle 10.

===Modification of Shapes of Air Outlets===

Figure 8A:
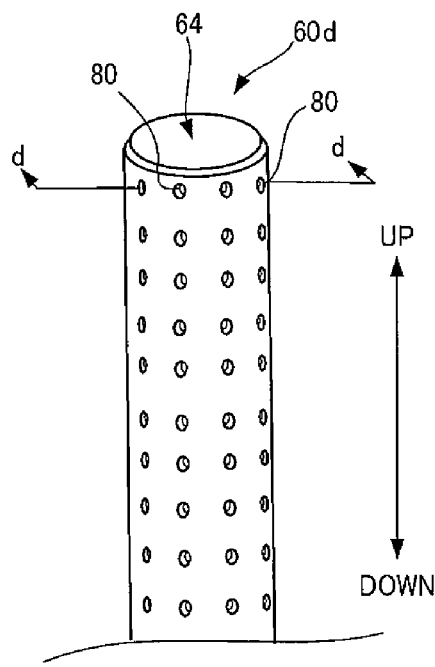
FIGS. 8A to 8C are diagrams showing another embodiment of the rod.
Figure 8B:
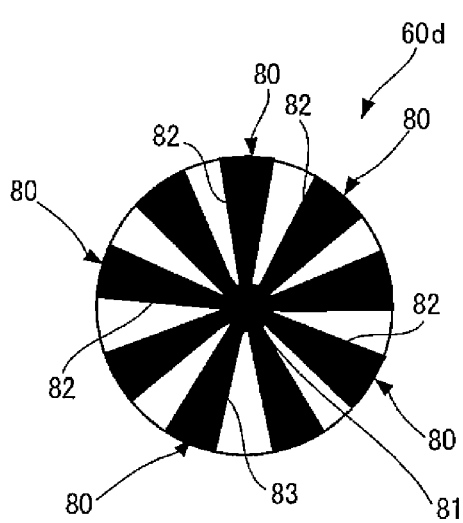
Figure 8C:
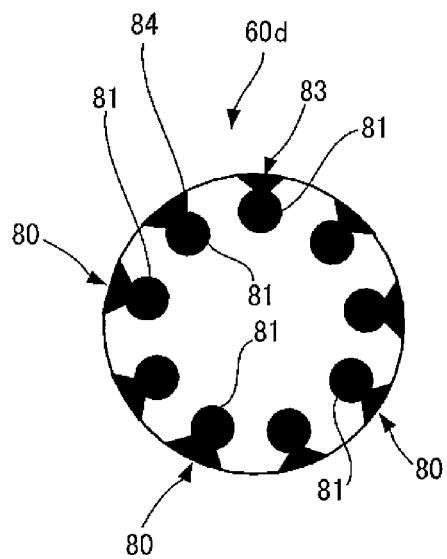

In the above embodiment, the opening shape of the air outlets 61*i* and 62*i* and the air exhaust outlet 63*i* is circular. Also, the paths from the supply pipes 61 to 63 to these openings 61*i* to 63*i*, including the radial branching path 64, are tube-shaped with a constant diameter. But, due to molding conditions of the outer 20, when the air is blown on toward an inner wall of the inner bottle 10, jet of the air concentrates on one point, and there is a possibility that the inner surface of the inner bottle 10 and the outer surface thereof is cooled in a punctiform manner. In such a case, when the molten resin that forms the outer 20 contacts the outer surface of the inner bottle 10, the molten resin may not smoothly flow in the cooled portion, and the outer 20 is not uniformly covered on the outer surface of the inner bottle 10, and its aesthetic appearance will be degraded. The opening shape of the air outlets 61*i* and 62*i* may be made to be a shape that expands outward from inside the rod 60. FIGS. 8A and 8C show the rod 60*d* that has made changes to the opening shape of the air outlet 80. FIG. 8(A) is a perspective view of the rod 60*d*, FIGS. 8(B) and (C) are modifications of the openings at d-d sections of FIG. 8(A). With the rod 60*d* shown in FIGS. 8A and 8B, the shape of the air outlet 80 is in a tapered shape in which the diameter gradually expands towards the outside from the inside of the rod 60*d*. Further, as shown in FIG. 8(C), in the case where a plurality of supply pipes 81 are formed along the circumference of the circular dimension of the rod 60*d*, the configuration can be such that the air outlets 80 are formed so that from each supply pipe 81 to the outer side surface of the rod 60*d* the outlets are opened in a tapered shape.

Figure 9A:
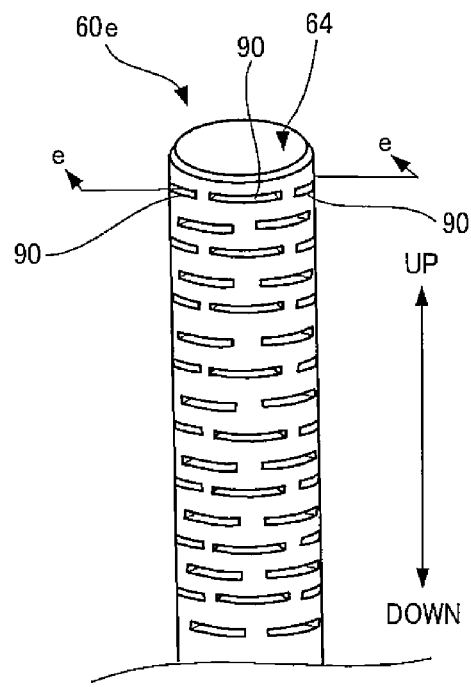
FIGS. 9A to 9C are diagrams showing a modified example of the rod according to the other embodiment.
Figure 9B:
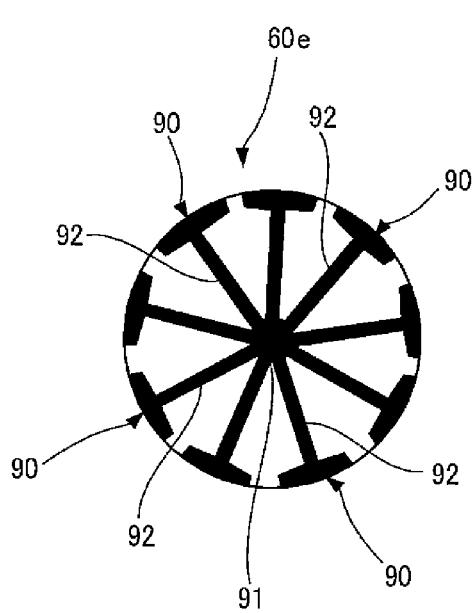
Figure 9C:
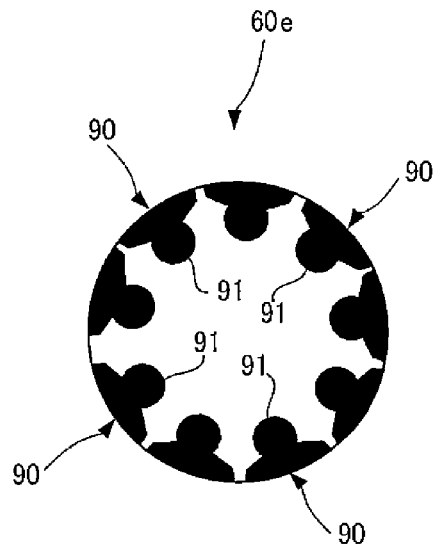

Further, the opening shape of the air outlet is not limited to the tapered shape, as long as the outlet expands from the inside to the outside of the rod. For example, the shape of the opening end of the air outlet may be oval, or the opening shape of the air outlet 90 may be a slit shape as the rod 60*e* shown in FIG. 9. FIG. 9(A) is a perspective view of the rod 60*e*, and FIGS. 9(B) and (C) are modified forms of the opening at e-e cross sections of FIG. 9 (A). As shown in FIG. 9(B), the air outlets 90 may be formed in a slit shape at each top end of the branching path 92 that branches radially from one supply pipe 91, or as shown in FIG. 9(C), the air outlets 90 may be opened in a slit shape toward the side surface of the rod 60*e* directly from each of the plurality of supply pipes 91 arranged along the circumference of the circular section of the rod 60*e*. Of course, the branching paths 92 in FIG. 9(B) may be a shape in which the width gradually expands towards the opening end of the air outlet 90. Further, the extending direction of the slit does not have to be in a direction along the circumferential direction of the side surface of the rod 60*e*, and may be in a vertical direction along the extending direction.

As described above, regarding the rods 60*d* and 60*e* shown in FIGS. 8 and 9, since the opening area of the air outlets 80 and 90 is made larger at the outside than the inside, the air is blown on to the inner wall of the inner bottle in a diffused state. In that way, the air does not concentrate on one spot, and the outer is not ununiformly covered due to ununiform cooling. Therefore, a high quality overmolded container that is aesthetically pleasing can be provided.

===Modification of Overmolded Containers===

Figure 10A:
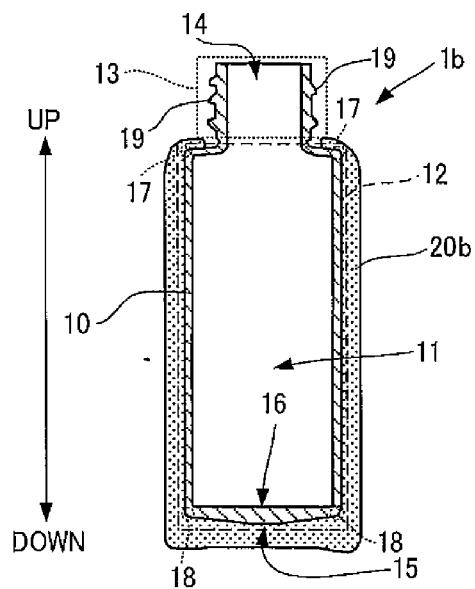
FIGS. 10A to 10C are diagrams showing other examples of the overmolded container according to the present invention.
Figure 10B:
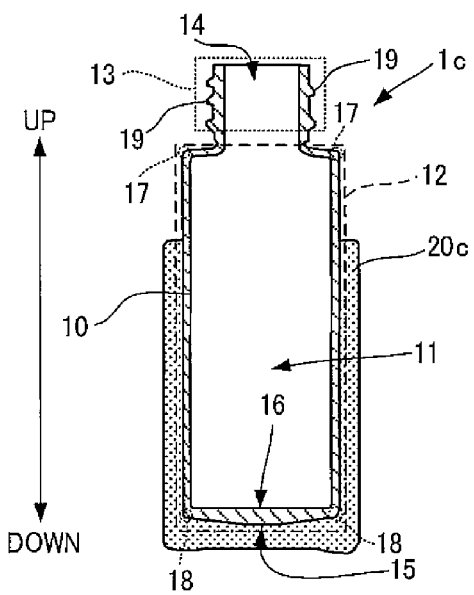
Figure 10C:
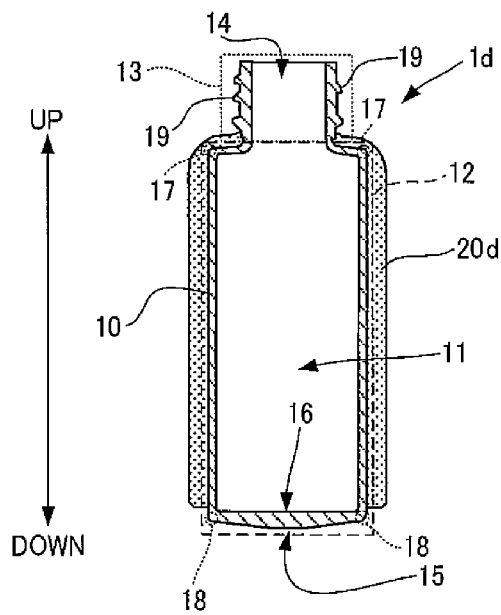

The overmolded container according to this invention is not limited to a configuration in which the outer 20 covers the inner bottle 10 from the base portion of the neck 13 to the bottom portion 15, as in the overmolded container 1 shown in FIG. 1. The configuration of the overmolded container can be such that the outer 20*b* covers the inner bottle away from the base of the neck, as in the overmolded container 1*b* shown in FIG. 10(A), or a configuration in which the outer 20*c* covers from the bottom portion 15 to a part of the storing portion 12. Further, in the above embodiment, the mold 50 is injected with the molten resin from the bottom portion 15 opposite to the inner bottle 10, but if a mold provided with a gate on the side is used, an overmolded container in which the bottom portion 15 is not covered by the outer 20*d* can also be formed as shown in FIG. 10(C). In other words, this invention relates to an overmolded container in which at least a part of the outer surface of the inner bottle is covered by the outer.

Although the present invention has been described with reference to the preferred embodiments of the present invention, modifications and alternations may be made within the scope of the present invention.

What is claimed is:

1. A method for forming an overmolded container by covering a hollow inner bottle made of resin with an injection of a molten resin which forms an outer, the method comprising:

setting the inner bottle in a mold with a space therebetween for forming the outer; and circulating a pressurized gas into and out of a hollow space of the inner bottle through an upper opening thereof while the molten resin is injected to the mold;

wherein the pressurized gas is supplied through a first path which opens toward an inner wall of the inner bottle, and the pressurized gas is discharged out of the inner bottle through a second path, the second path being open in the inner bottle at a place away from the opening of the first path, wherein the pressurized gas supplied into and discharged out of the inner bottle is adjusted in pressure while the molten resin is being injected to the mold, and wherein the inner bottle is formed to have a corner portion, and the pressurized gas supplied into the inner bottle is blown through the opening of the first path, which opening is opposite to the corner portion.

2. A method for forming an overmolded container according to claim 1, wherein an outer surface of the inner bottle has a printed decoration, and the outer is made of a light permeable resin, and wherein the pressurized gas supplied into the inner bottle is blown through the opening of the first path, which opening is opposite to the decorated portion.

3. A method for forming an overmolded container according to claim 1, wherein the inner bottle is formed to have a cylindrical shape with an open neck portion at an upper end of a cylindrical hollow body and a shoulder portion at a base of the neck portion, and wherein the pressurized gas supplied into the inner bottle is blown through upper and lower openings of the first path, the upper opening being open opposite to the corner portion at the shoulder portion, and the lower opening being open opposite to a bottom corner of the cylindrical hollow body.

4. A method for forming an overmolded container according to claim 3, wherein the second path for discharging the pressurized gas is open in the inner bottle at a place between the upper and lower openings of the first path.

\* \* \* \* \*